3,567,760
PROCESS FOR DIMERIZATION OF UNSATURATED NITRILES UTILIZING A NITROGEN-CONTAINING CATALYST
Julian Feldman, Bernard A. Saffer, and Jack Kwiatek, Cincinnati, Ohio, assignors to National Distillers and Chemical Corporation, New York, N.Y.
No Drawing. Filed Dec. 27, 1967, Ser. No. 693,711
Int. Cl. C07c 121/26
U.S. Cl. 260—465.8                              7 Claims

ABSTRACT OF THE DISCLOSURE

A process for dimerization of unsaturated nitriles in which a nitrogen-containing compound is employed as the catalyst. The preferred catalyst systems comprise tertiary amines or quaternary ammonium compounds in the presence of an alcohol.

---

This invention relates to novel dimerization catalysts for producing dimers from unsaturated nitriles. More particularly, the invention pertains to a process utilizing a novel class of catalysts for the dimerization of acrylonitrile to produce 2-methylene glutaronitrile.

The dimerization processes proposed heretofore involve, in general, dimerizing acrylonitrile compounds, and especially acrylonitrile itself, in the presence of inert solvents at moderate temperatures using as catalysts phosphorus-containing compounds such as tertiary phosphines or adducts of tertiary phosphines with zerovalent nickel catalysts derived from nickel carbonyl to form the unsaturated dinitrile products. Various trialkyl phosphines, tricycloalkyl phosphines, and mixed alkyl aryl phosphines have previously been disclosed. It has been disclosed to use organic solvents including benzene, xylene, dimethylformamide, acetonitrile and the like with the phosphorus-containing catalysts. It has also been known that an aliphatic alcohol might be employed in the reaction mixture.

These dimer products are useful as monomers for polymerization, as chemical intermediates, and as solvents. Utilizing acrylonitrile for instance, as the starting material in these reactions the dimer product is 2-methylene glutaronitrile having the following formula:

$$NC-CH_2CH_2-\overset{\overset{CH_2}{\|}}{C}-CN$$

The unique structure of this compound enables it to undergo special addition polymerization and copolymerization reactions. The 2-methylene glutaronitrile is also capable of being selectively hydrogenated to prepare various intermediates as well as diamines and dibasic acids.

One object of the present invention is to provide an improved process for the dimerization of acrylonitrile to give good conversions and yields of the 2-methylene glutaronitrile.

Another object of the present invention is to employ as the catalyst nitrogen-containing organic compounds under certain specific operating conditions to give good conversions and yields of the 2-methylene glutaronitrile.

These and other objects of the invention will become readily apparent from the ensuing description and illustrative embodiments.

In accordance with the present invention, it has been found that particularly good conversions and yields of the unsaturated dinitrile can be obtained by dimerizing acrylonitrile in the presence of at least one nitrogen compound using tertiary amines or quaternary ammonium hydroxides as the catalysts. The process is carried out by heating a solution of the unsaturated nitrile and the selected nitrogen-containing catalyst under inert atmosphere to give a mixture of linear and branched dinitriles. More specifically, in carrying out the process, the catalyst may be added to a mixture of acrylonitrile and alcohol under an inert atmosphere. The reaction mixture is then heated to an elevated temperature for 20 hours or more, the products can be isolated by distillation at reduced pressure. It is also possible to carry out the reaction using either an aromatic or a polar solvent.

The nitrogen compounds which are the catalysts of this invention may have the formula,

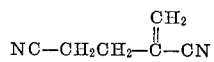
$$(A)_nN(OH)_m$$

wherein A is an alkyl, aralkyl, aryl, alkaryl, alicyclic, reterocyclic, or spiro group having 6 to 10 carbon atoms and may include such groups as methyl, ethyl, propyl, isopropyl, butyl, isobutyl, tert-butyl, amyl, isoamyl, tert-amyl, hexyl, heptyl, octyl, benzyl, phenethyl, phenyl, tolyl, xylyl, ethylphenyl, pyridyl, cyclopentyl, cyclohexyl, cycloheptyl and the like, or two A substituents may be taken together with the nitrogen atom to form a piperidine or morpholine ring. A may share a common atom such as B in $B_{1/x}$—$CH_2$—$CH_2$—, where $x=2$ or 3 and B is nitrogen, oxygen or carbon. The subscript $n$ may be either 3 or 4. The A groups may all alike, all different, or one or more may be different. The subscript $m$ may be 0 or 1. If $n$ is 4 and $m$ is 1, the compound will be a quaternary ammonium hydroxide. The nitrogen atom may be part of a heterocyclic ring or it may be a part of a spiro structure.

Illustrative tertiary amines are as follows:

Trimethylamine
Triethylamine
Tripropylamine
Tributylamine
Diethylmethylamine
Dimethylethylamine
Dimethylhexylamine
Dimethylbenzylamine
Ethyldibenzylamine
Tribenzylamine
N-methylpiperidene
N-ethylpiperidine
N-methylmorpholine
N-ethylmorpholine
N-methylpyrrolidine
N-ethylpyrrolidine, and the like.

A preferred embodiment of the instant quarternary ammonium compounds is represented by the structure $A_3XN(OH)$ wherein X is alkyl and A is as defined above. Illustrative quaternary ammonium hydroxide compounds are as follows:

Trimethylbenzylammonium hydroxide
Tetramethylammonium hydroxide
Triethylbenzylammonium hydroxide
Tetraethylammonium hydroxide
Methyltribenzylammonium hydroxide
N-diethylpiperidine hydroxide
N-methyl, N-ethylmorpholine hydroxide, and the like.

Especially preferred for use are the cyclic tertiary amines, such as 1,4-diazabicyclo (2,2,2) octane and aliphatic quaternary ammonium compounds such as trimethylbenzylammonium hydroxide.

The selected catalyst compound may be employed in amounts ranging from about 0.01 to 10% by weight, and preferably about 0.03 to 1% by weight, based on the weight of the acrylonitrile compound. Excess catalyst should be avoided since under such conditions increased amounts of undesirable polymer may be produced. It will be understood, however, that only catalytic amounts of the nitrogen compound need be employed for the dimerization.

In accordance with this invention, it has been found useful to employ reaction temperatures which range from about —40° C. to 200° C., preferably from about 20° to 150° C. At lower temperatures conversions and yields of the desired unsaturated dinitriles decrease. When higher temperatures are used conversions decrease with no significant change in the ratio of dimer to polymer.

The pressure employed in carrying out the novel dimerization process of this invention is not critical and may vary over a wide range. Thus, for example, the pressure may range from atmospheric to as high as 100 atmospheres without encountering undesirable results. The process can be run at atmospheric pressure up to the reflux temperature of the reacting mixture. Above this temperature, pressure is required to contain the reactants within the reaction vessel.

It has been found desirable to conduct the dimerization of the nitriles under an inert atmosphere. The inert atmosphere is conveniently nitrogen but sometimes the use of acetylene may be beneficial. Any other non-reacting gas, such as helium or argon, may be used.

It has been found desirable to employ in the dimerization reaction an aliphatic alkanol. For instance, the lower molecular weight alkanols having from 2 to 12 carbon atoms such as ethanol, isopropanol, t-butanol, isoamyl alcohol, t-amyl alcohol, sec-butyl alcohol, n-hexyl alcohol, 2-ethyl hexyl alcohol, octyl acohol, decyl alcohol, and the like have been found useful. The ratio of alkanol to unsaturated nitrile reactant varies over a broad range depending upon the catalyst employed. The alkanol may vary from 0.5 to 99 parts, but preferably from 5 to 96 parts, while the acrylonitrile may vary from 99 to 1 part but preferably from 95 to 4 parts.

The nitrile-alkanol mixture can be diluted up to five times with another miscible, inert or non-reacting solvent. Preferably the dilution should be less than one to one. Typical diluent solvents include aromatic hydrocarbons such as benzene, p-xylene, o-xylene, m-xylene, toluene, ethylbenzene, cumens, cymene and the like having from 6 to 10 carbon atoms per molecule; aliphatic ketones having from 3 to 10 carbon atoms, such as acetone, methyl isobutyl ketone, methyl ethyl ketone, and the like; aliphatic ethers having from 4 to 12 carbon atoms, such as dioxane, tetrahydrofuran, isophorone, phorone, morpholine, N-methyl morpholine, and the like; acetonitrile; and esters such as ethyl acetate, butyl acetate and the like.

A polymerization inhibitor such as p-tertiarybutyl catechol may also be employed in the reaction mixture. It will be understood, however, that the use of a polymerization inhibitor is not required in practicing the dimerization process of this invention. When an inhibitor is employed the amount may range from about 0.001 to 0.5% by weight based on the weight of the acrylonitrile compound employed as the starting material.

The dimerization reaction of this invention is generally accomplished in about 2 to 24 hours, and the reaction is preferably carried out in a time period of about 5 to 20 hours.

Although acrylonitrile is the preferred starting material in the dimerization process of this invention, other useful acrylonitrile compounds include those having the formula:

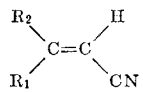

wherein $R_1$ and $R_2$ may be either hydrogen, alkyl radicals or aryl groups having 1 to 10 carbon atoms, or any radicals or groups having 1 to 10 carbon atoms. Illustrative suitable acrylonitrile compounds include beta-substituted derivatives such as cinnamonitrile, fumaronitrile, and the like. For purposes of convenience, the present invention has been particularly described and illustrated herein by utilizing acryonitrile as the starting material for the preparation of 2-methylene glutaronitrile.

In general, the amount of acrylonitrile compound employed in the reaction mixture will range from about 5 to 95%, and preferably 10 to 40%, by volume based on the total volume of the reaction mixture.

The improved dimerization process may be carried out by rapidly adding the acrylonitrile, either alone or admixed with suitable solvent mixture, to a rapidly stirred, dilute solution of the catalyst in the absence of oxygen and water. The time required for the addition should be within the range of about 0.1 to 2 hours. It is also possible to add all of the catalyst at one time to the total mixture of acrylonirile and solvent. During this period, it is preferred to maintain the reaction temperature fairly constant and within the aforedisclosed range.

When the reaction is complete, the catalyst is neutralized by the addition of an acid, preferably an organic acid such as sebacic or propionic acids or by exposure to oxygen, e.g., exposure to air. The solvent mixture and unreacted acrylonitrile are then removed by distillation, with the temperature preferably being maintained below about 100° C. After removal of solvent, the dimer is distilled from the residue at a subatmospheric pressure.

It will be understood that the above method of recovering the unsaturated dimer from the reaction product mixture is not a critical feature of this invention and that other recovery methods may be employed without departing from the broad aspects of this invention. Moreover, recovery methods may be employed which include catalyst, acrylonitrile and solvent mixture recycling.

The invention will be more fully understood by reference to the following illustrative embodiments.

EXAMPLE 1

A solution consisting of 95 parts acrylonitrile and 5 parts t-butyl alcohol and 1 part 1,4-diazabicyclo (2,2,2) octane was heated under a nitrogen atmosphere at 145° C. for 20 hours. When cooled, the resulting reaction mixture contained 1 part 2-methylene glutaronitrile and 0.2 part linear dimer, as shown by gas-liquid chromatographic analysis.

EXAMPLE 2

To a solution consisting of 50 parts of t-butyl alcohol and 2 parts trimethylbenzylammonium hydroxide (commercially known as Triton B) under an inert atmosphere of nitrogen was added 20 parts of acrylonitrile. At the same time acetylene was bubbled through the solution. During this period, the temperature rose from 26° C. to 55° C. and the solution turned orange. After 15 minutes reaction time the mixture was diluted with an excess of methanol, the small amount of insoluble yellow solid was removed and the filtrate was concentrated to 100 parts. Gas-liquid chromatographic analysis showed 0.25 part of 2-methylene glutaronitrile was present.

While particular embodiments of the use of the catalysts of this invention are set forth in the above process examples, it will be understood that the invention is obviously subject to variations and modifications without departing from its broader aspects.

What is claimed is:

1. A process for the preparation of 2-methylene glutaronitrile which comprises dimerizing acrylonitrile in an inert atmosphere, at a reaction temperature within the range of about —40° C. to 200° C. in the presence of a catalyst having the formula $A_3XN(OH)$ wherein X is alkyl and each A is selected from the group consisting of alkyl having from one to eight carbon atoms, benzyl, phenethyl, phenyl, tolyl, xylyl, ethylphenyl, pyridyl, cyclopentyl, cyclohexyl and cycloheptyl, or two A substituents may be taken together with the nitrogen atom to form a heterocyclic ring selected from the group consisting of piperidine and morpholine.

2. The process of claim 1 wherein said catalyst is trimethylbenzylammonium hydroxide.

3. The process of claim 1 wherein acrylonitrile is dimerized in the presence of an alkanol of 2 to 12 carbon atoms.

4. The process of claim 3 wherein said alkanol is t-butyl alcohol.

5. A process for preparing 2-methylene glutaronitrile which comprises contacting acrylonitrile with trimethylbenzylammonium hydroxide catalyst at a temperature from about −40° C. to 200° C. in the presence of an alkanol of 2 to 12 carbon atoms.

6. The process of claim 1 wherein said catalyst is selected from the group consisting of trimethylbenzylammonium hydroxide, tetramethylammonium hydroxide, triethylbenzylammonium hydroxide, tetraethylammonium hydroxide, methyltribenzylammonium hydroxide, N-diethylpiperidine hydroxide and N-methyl, N-ethylmorpholine hydroxide.

7. The process of claim 1 wherein the reaction time is from 2 to 24 hours.

References Cited
UNITED STATES PATENTS

| | | | |
|---|---|---|---|
| 3,225,082 | 12/1965 | McClure | 260—465.8X |
| 3,225,083 | 12/1965 | McClure | 260—465.8X |
| 3,444,235 | 5/1969 | Chabardes et al. | 260—465.8 |
| 3,446,836 | 5/1969 | Lambert et al. | 260—465.8 |

JOSEPH P. BRUST, Primary Examiner

U.S. Cl. X.R.

260—465